INVENTOR.
FRANK L. CHRISTENSEN
By Bernard Kriegel
ATTORNEY.

Aug. 27, 1968 F. L. CHRISTENSEN 3,398,989
DIAMOND MILLING OR PLANER CUTTERS
Filed Nov. 14, 1966 2 Sheets-Sheet 2
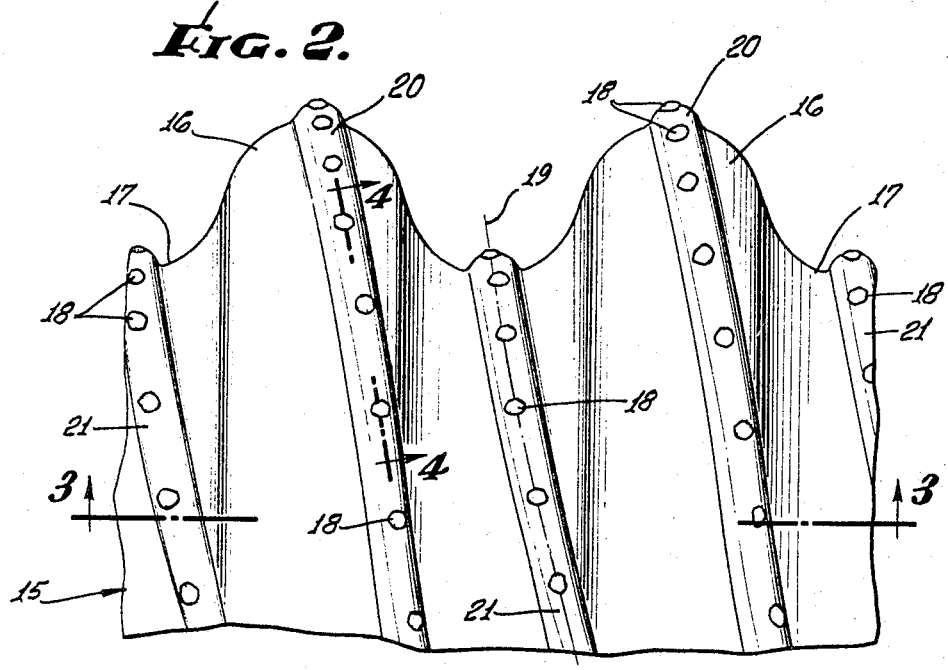
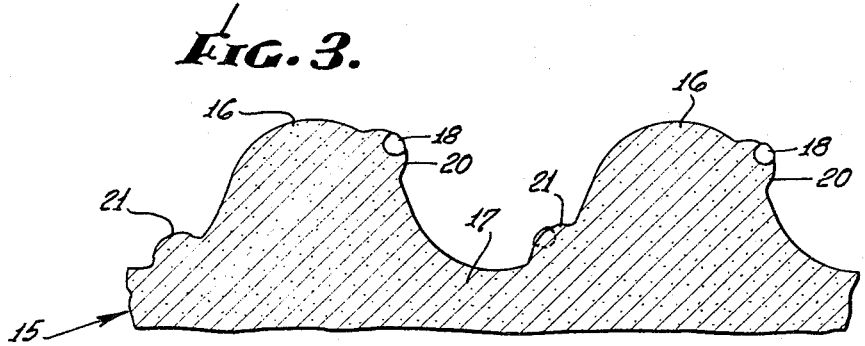
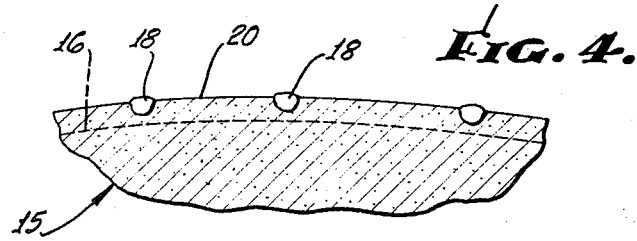
INVENTOR.
FRANK L. CHRISTENSEN
BY Bernard Kriegel
ATTORNEY.

United States Patent Office 3,398,989
Patented Aug. 27, 1968

3,398,989
DIAMOND MILLING OR PLANER CUTTERS
Frank L. Christensen, Salt Lake City, Utah, assignor to Christensen Diamond Products Company, Salt Lake City, Utah, a corporation of Utah
Filed Nov. 14, 1966, Ser. No. 594,056
20 Claims. (Cl. 299—39)

The present invention relates to milling or planer cutters, which are particularly useful for removing pronounced irregularities in concrete surfaces, or in replaning such surfaces to produce a substantially flat, level surface having parallel ridges extending along the direction of travel of the milling or planer cutter.

In the application of Frank L. Christensen and Donald H. Mabey, Ser. No. 345,425, filed Feb. 17, 1964, for "Diamond Milling Cutters," and now Patent No. 3,306,669, a rotatable diamond milling cutter is disclosed which is capable of producing parallel ridges in an airstrip or highway surface, which ridges run lengthwise of the latter, for the purpose of stabilizing aircraft taking off from or landing on the airstrip, or to enhance the control of automobiles and other vehicles traversing the highway. The cutter illustrated is of generally cylindrical exterior and has axially spaced parallel circular ridges separated by parallel grooves or troughs, the ridges and the troughs having diamond cutting elements embedded therein for performing the cutting action upon the airstrip or highway surface. Care must be exercised in proper placing of the diamonds in the ridges and in the parallel grooves or troughs, involving a time consuming and relatively costly operation.

An object of the present invention is to provide a rotatable diamond milling or planer cutter which is capable of producing a corrugated surface in a concrete runway or highway, the ridges of the concrete surfaces being strong and sturdy, and well capable of withstanding the traffic of the vehicles passing thereover.

Another object of the invention is to provide a diamond milling or planer cutter, in which controlled diamond spacing and exposure in the cutter matrix is more easily obtained, where the cutter has parallel ridges and intervening parallel grooves normal to the rotational axis of the cutter. Precise uniform diamond exposure on a finished outer surface of such a cutter is secured, particularly where the outer surface of the cutter is of wave form, the wave crest and wave troughs proceeding from one to the other lengthwise of the cutter.

A further object of the invention is to provide a diamond milling or planer cutter made of matrix material, and having circular ridges or crests and intervening troughs normal to the rotational axis of the cutter, which are crossed by a helical pattern of diamonds proceeding in undulant fashion over the crests and troughs of the matrix material.

An additional object of the invention is to provide a diamond milling or planer cutter having circular crests and intervening grooves or troughs, on which are imposed a helical ridge or rib of matrix material and in which are embedded a helically arranged pattern of diamonds, the diamonds being supported by the ridge of matrix material.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIG. 2 is an enlarged fragmentary side elevational view of the crest and trough portions of the cutter disclosed in FIG. 1, illustrating the helical rib of matrix material extending around the cutter, and in which the diamond cutting elements are embedded;

FIG. 3 is a section taken along the line 3—3 on FIG. 2;

FIG. 4 is a section taken along the line 4—4 on FIG. 2.

Figure 1:
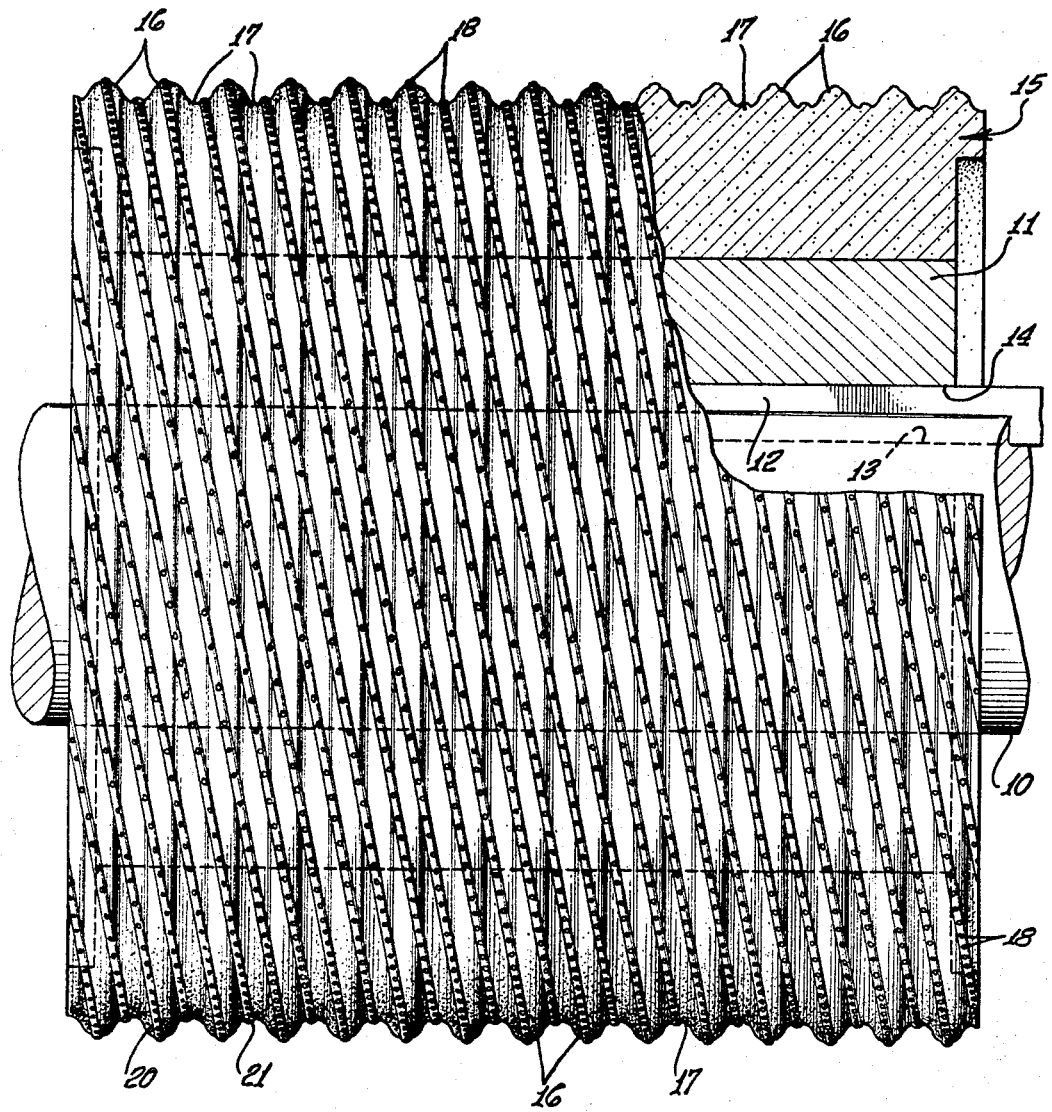
FIGURE 1 is a side elevational view, with a portion thereof broken away, of a diamond milling or planer cutter embodying the invention.

As illustrated in the drawings, a cutter device is provided which includes a drive shaft or spindle 10 adapted to be rotated by a suitable drive mechanism (not shown), and on which an annular hub 11 of the cutter member is suitably secured, as through use of an intervening key 12 extending into a longitudinal, external keyway 13 in the drive shaft and into an internal keyway 14 in the hub. The hub 11 can be made of steel and has a generally cylindrical matrix body 15 cast on its outer portion. Although only a single cutter member is disclosed as being mounted on the drive shaft or spindle 10, a plurality may be mounted on a single shaft in end-to-end adjacency, so as to obtain the desired width of cut on the concrete roadway or airstrip having the surface to be conditioned or reconditioned.

The generally cylindrical matrix body 15 includes axially spaced parallel circular ridges 16 of matrix material formed therein, these ridges being separated by circumferentially continuous parallel grooves or troughs 17, each ridge and trough being normal to the axis of rotation of the cutter member. Accordingly, the ridges 16 are capable of cutting grooves (not shown) in the surface of the roadway or airstrip, leaving intervening ribs (not shown). The circular ridges 16 and intervening grooves or troughs 17 are essentially the same as disclosed in the above-identified United States application, Ser. No. 345,425. In the preferred form of the invention disclosed in the present drawings, the ridges 16 and grooves 17 are of wave form. Surface set diamond cutting elements 18 are mounted in each cutter to produce the parallel ribs in the roadway or runway surface, the diamonds being set in a helical pattern around the circumference of the generally cylindrical matrix body 15. As specifically illustrated, the diamonds are mounted in the periphery of the matrix body in the manner of a divided pitch screw thread, that is, the pitch of each thread or pattern of diamonds is a fraction of its lead.

Each helical pattern 19 of diamonds runs continuously from the crest 20 of a ridge down its side into an adjacent trough 17 and then up the side of the adjacent ridge to its crest, down the other side of such adjacent crest to the next succeeding groove or trough, and continuing in such fashion helically around the circumference of the matrix body 15. In other words, each helical pattern 19 of spaced-apart diamonds proceeds in wave or undulant fashion around the circumference of the matrix body, succeeding diamonds being disposed at different distances from the axis of the cutter. Because of the use of a divided pitch arrangement, a multiplicity of diamonds or cutting elements 18 is available, which lie in the same plane normal to the axis of the cutter member, for cutting the surface of the roadway or airstrip, to insure the removal of the concrete or other material and the production of the grooves (not shown) in the surface and the parallel intervening ridges (not shown).

Each helical thread pattern is actually provided by a helical rib or bead 21 of matrix material, in which the individual and spaced-apart diamond cutting elements 18 are embedded. In effect, it is the ribs or beads 21 that proceed in helical fashion around the circumference of the matrix body 15, each bead dipping into a trough 17 and then rising upwardly along the side of the next ridge 16, each bead being of much lesser radial extent than the radial distance between the bottom of a trough and the crest of a ridge. The setting of the diamond cutting elements 18 in the helical ribs or beads 21 causes the matrix material of the beads, which is formed integrally with the matrix material of the ridges 16 and the remainder of the matrix body 15, to fully support each diamond cutting element 18, except for its outer exposed surface, insuring its retention in the bead 21 and adding to the long and effective cutting life of the entire milling or planer cutter.

Although not specifically disclosed in the drawings, the generally cylindrical matrix body 15, with its crests 16, grooves 17 and the helical ribs 21, are formed by providing a graphite mold in which a wave crest and a wave trough are first produced with a suitable cutting tool during the rotation of the graphite mold. A helical groove is then produced in the wave form of the mold, which will be of a much shallower extent than the circular grooves cut in the graphite mold, which helical groove will proceed in undulant fashion into and out of the mold grooves. Since divided pitch helical grooves are used, a plurality of the helical grooves will be cut into the graphite mold. Diamonds 18 are set in each of these helical grooves in a relatively easy and rapid manner, to achieve precise and uniform spacing between the diamonds, and also uniform diamond exposure, since the depth of each helical groove is uniform.

Following the setting of the diamonds in the appropriate spaced relation with respect to one another in the mold, the latter is properly related to the steel hub 11, the matrix material being placed within the mold, and the appropriate furnacing operation performed, the matrix material shifting into the circular mold grooves that will form the wave crests 16 and wave troughs 17, and also into the helical grooves that are provided over the inner circular wave formed surface of the mold, the matrix material being fused to the hub 11 and also forming the wave crests 16, wave troughs 17 and the helical beads 21 in which the diamond cutting elements 18 are embedded.

The resulting cutter provides for uniform diamond exposure, and also provides flushing space for water during the use of the milling cutter or planer in operating upon the concrete or other surface being cut, for the purpose of removing the cuttings, cleaning the diamonds, and maintaining the diamonds in a cool condition. During its rotation, the wave crests 16 and wave troughs or grooves 17 produce the ribbed surface in the concrete surface of the roadway or airport runway.

It is apparent that a milling or planer cutter has been provided in which controlled diamond exposure and spacing has been provided around the surface of a matrix member 15 having a multiplicity of wave formed circular grooves, there being a helical ridge or helical ridges 21 running the entire length of the cylindrical matrix body, with diamonds set in this helical rib or bead to assure maximum support for each diamond cutting element, and to also provide an exposed area around each rib that allows a maximum passage of cutting fluid to adequately cool the individual diamonds and provide a maximum flushing of the cuttings from the working region. The cutter produces textured or ribbed surfaces in the concrete or other material in a rapid, efficient and economical manner, the ribbed surface produced lying in a comparatively flat plane and having antiskid properties.

I claim:

1. In a milling cutter: a body adapted to be rotated about an axis, said body comprising axially spaced circumferential ridges extending around its periphery and disposed normal to the body axis and providing axially spaced circumferential grooves between said ridges disposed normal to the body axis; and cutting elements disposed in a helical pattern in the periphery of said body over its ridges and grooves.

2. In a milling cutter as defined in claim 1; wherein said cutting elements comprise diamonds.

3. In a milling cutter as defined in claim 1; wherein said cutting elements comprise individual diamonds embedded in said body in spaced relation to each other along said helical pattern.

4. In a milling cutter as defined in claim 1; wherein said helical pattern has a divided pitch.

5. In a milling cutter as defined in claim 1; wherein said helical pattern has a divided pitch; said cutting elements comprising individual diamonds embedded in said body in spaced relation to each other along said helical pattern.

6. In a milling cutter as defined in claim 1; wherein said body is a generally cylindrical unitary member of matrix material.

7. In a milling cutter as defined in claim 1; wherein said body is a generally cylindrical unitary member of matrix material; said cutting elements comprising individual diamonds embedded in said body in spaced relation to each other along said helical pattern.

8. In a milling cutter as defined in claim 1; wherein said body is a generally cylindrical unitary member of matrix material; said cutting elements comprising individual diamonds embedded in said body in spaced relation to each other along said helical pattern; said helical pattern having a divided pitch.

9. In a milling cutter as defined in claim 1; wherein said ridges and grooves are of wave form.

10. In a milling cutter as defined in claim 1; wherein said body is a generally cylindrical unitary member of matrix material; said cutting elements comprising individual diamonds embedded in said body in spaced relation to each other along said helical pattern, said ridges and grooves being of wave form.

11. In a milling cutter; a body adapted to be rotated about an axis, said body comprising axially spaced circumferential ridges extending around its periphery and disposed normal to the body axis and providing axially spaced circumferential grooves between said ridges disposed normal to the body axis; said body further having a helical rib on its periphery extending over its ridges and grooves; and cutting elements embedded in said helical rib.

12. In a milling cutter as defined in claim 11; wherein said cutting elements comprise diamonds.

13. In a milling cutter as defined in claim 11; wherein said cutting elements comprise individual diamonds embedded in said rib in spaced relation to each other.

14. In a milling cutter as defined in claim 11; wherein a plurality of helical ribs are provided on the periphery of said body and extending over said ridges and grooves, said ribs having a divided pitch.

15. In a milling cutter as defined in claim 11; wherein a plurality of helical ribs are provided on the periphery of said body and extending over said ridges and grooves, said ribs having a divided pitch; said cutting elements comprising individual diamonds embedded in said ribs in spaced relation to each other.

16. In a milling cutter as defined in claim 11; wherein said body is a generally cylindrical unitary member of matrix material.

17. In a milling cutter as defined in claim 11; wherein said body is a generally cylindrical unitary member of matrix material; said cutting elements comprising individual diamonds embedded in said ribs in spaced relation to each other.

18. In a milling cutter as defined in claim 11; wherein said body is a generally cylindrical unitary member of matrix material; said body having a plurality of helical ribs on its periphery extending over its ridges and grooves, said ribs having a divided pitch; said cutting elements comprising individual diamonds embedded in said ribs in spaced relation to each other.

19. In a milling cutter as defined in claim 11; wherein said ridges and grooves are of wave form.

20. In a milling cutter as defined in claim 11; wherein said body is a generally cylindrical unitary member of matrix material; said body having a plurality of helical ribs on its periphery extending over its ridges and grooves, said ribs having a divided pitch; said ridges and grooves being of wave form; said cutting elements comprising individual diamonds embedded in said ribs in spaced relation to each other.

References Cited

UNITED STATES PATENTS

| | | | |
|---|---|---|---|
| 3,196,585 | 7/1965 | Christensen et al. | 51—206 |
| 3,306,669 | 2/1967 | Christensen et al. | 299—40 X |

ERNEST R. PURSER, *Primary Examiner.*